J. C. DURBOROW.
Harvester Rake.
No. 91,315.
Patented June 15, 1869.
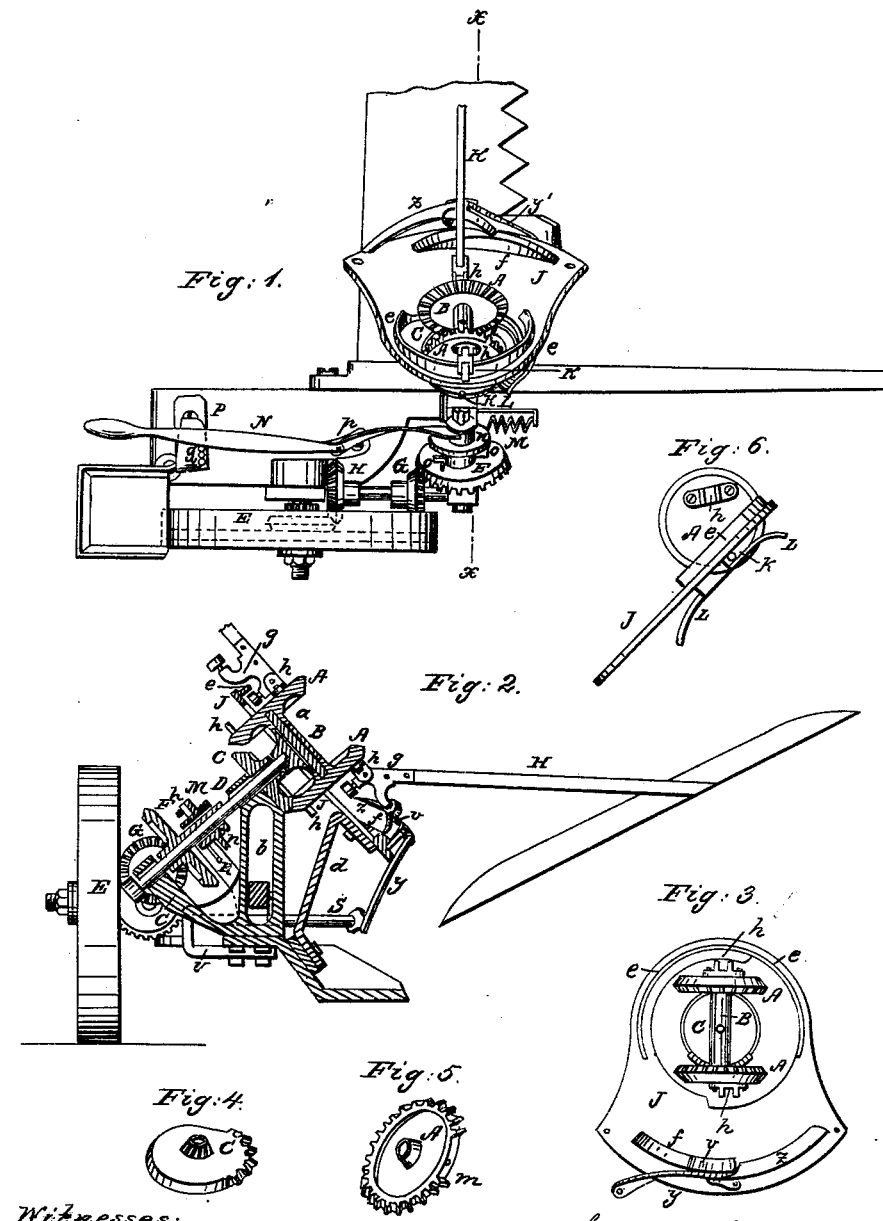

UNITED STATES PATENT OFFICE.

JOHN C. DURBOROW, OF ELLICOTT CITY, MARYLAND.

IMPROVEMENT IN HARVESTER-RAKES.

Specification forming part of Letters Patent No. 91,315, dated June 15, 1869.

*To all whom it may concern:*

Be it known that I, JOHN C. DURBOROW, of Ellicott City, in the county of Howard and State of Maryland, have invented certain new and useful Improvements in Harvesters; and I do hereby declare that the following is a full, clear, and exact description of the construction and operation of the same, reference being had to the accompanying drawings, making a part of this specification, in which—

Figure 1 is a plan view. Fig. 2 is a sectional view, as indicated by the line $x$ $x$ of Fig. 1. Fig. 3 is a view, in detail, of inclined plate, showing its relative position with movable and fixed gear, and also a view of device thereon for shifting the rakes. Figs. 4 and 5 are views, in detail, of movable and fixed gear. Fig. 6 is a view, in detail, of inclined plate, showing guide for preventing the movable gears from oscillating while revolving.

Like letters in the figures of the drawings indicate like parts.

My invention is intended as an improvement upon that in harvester-rakes patented by me the 9th of June, 1868. In that the required raking motion of the rake was produced by means of a movable gear-wheel, being so arranged with a fixed gear, and a shaft passing through the latter, as that, by the motion of the shaft, the movable gear was caused to rotate, and hence revolve the rake, the arm thereof being attached to the movable gear; but, in order to carry out this arrangement, the platform had to be made concave, to conform to the sweeping motion of the rake, which I have found, by practical use, to be objectionable in some respects; and, besides this, the movable gear, while it gave a revolving motion to the rake, at the same time gave it a rotary motion, which caused it to interfere with the position of the driver.

Now, the object of my present invention is to avoid these objections; and it consists, first, of an inclined plate, provided with a curved bar and flange, in combination with two movable gears and the fixed segment of a gear, the said movable gears being rigidly attached to a common shaft, having its bearings in a journal-box, the said journal-box being rigidly attached to an inclined shaft, and the heads of the rake-arms being so constructed and pivoted to the backs of the said movable gears as that the rakes will be elevated at the proper altitude by the curved bar, and thus sweep the platform in a parallel line with it while revolving thereacross; second, in providing each movable gear with a pin, in combination with a guide arranged on the under side of the inclined plate, so that, while one gear is being released from the segment, the pin of the opposite gear, interposing itself between the guide and plate, will prevent the gears from oscillating on their axes, and thus keep the large teeth of the gears in the proper position to cause them to engage properly with the teeth of the segment; third, in providing the heads of the rake-arms with forks having friction-rollers on their ends, and pivoting or hinging the head of a rake-arm so constructed to the back of each gear, in combination with a flange arranged on the upper side of the plate, so that the roller, by interposing itself between the back of the gear and the flange, will prevent the rake from tipping up and falling over the gear when revolving on the upper part of the plate.

I construct and operate my rake as follows:

A A are the movable gears, rigidly attached to the shaft $a$, having its bearings in the journal-box B. C is the fixed segment, provided with the necessary teeth, and bolted to the incline of the standard $b$. D is the inclined shaft, passing through the standard, and also through an arm, $c$, projecting angularly therefrom.

The journal-box B, being rigidly attached to the shaft D, and forming a shoulder thereon, retains the shaft properly within its bearings.

E is the driving-wheel; F, G, and H, gearing, by which motion is communicated from the driving-wheel to the shaft. J is the inclined plate, having a sufficient opening to receive and admit of the gears revolving within the same, (see Fig. 3,) and arranged in a line a little below the center of each gear, and secured by bolts to the arm $d$. Attached to the lower side of the plate is the curved bar $f$. K are the rake-arms, provided with forked heads $g$, having friction-rollers on their ends. The heads are pivoted to the brackets $h$ $h$, screwed or bolted onto the backs of the gears, next to their bevel-edges. Attached also to the backs of the gears, and opposite to the brackets, are the pins k k.

Under the plate is the guide L, which is placed on the front side of the plate, and a little below it, and curved to correspond with the edge of the opening thereof, the guide having an arm, by which it is bolted to the plate, and its ends curved or bent down to admit of the pins passing freely between the plate and the guide. The movable gears have a sufficient number of their teeth cut away to receive each a tooth, m, larger than the teeth of the gears.

To shift one or both of the rakes, while in operation, as the driver may desire, so that the rakes will pass over the grain without raking it, I make use of a device for accomplishing the same, which I propose to describe, but do not claim it as my invention, as follows: M is a collar, having a sliding movement on the inclined shaft, but prevented from turning thereon by a groove of the collar fitting over a square piece riveted or screwed to the shaft. The collar is provided with a flange, n, and two studs or pins, o o, projecting outwardly in opposite directions from the collar, and out of a line with each other, the one being near the lower edge of the collar, and the other just above, next to the flange thereof. N is a lever pivoted to a fulcrum, p, which is bolted to the axle plate or beam, and having a forked end embracing the collar, between the flange n and a flange on the upper end of the same, the opposite end of the lever resting on an inclined arm, P, also bolted to the axle beam or plate, and provided with a pin on its under side, so that when changing the position of the collar the lever may be held by inserting the pin in one of the four holes q which the arm is provided with. S is a rocking shaft, having an arm, R, projecting up in the rear of the collar, and caused to press against either the flange or the studs of the collar, (according to the position of the collar when moved by the lever,) by a spiral spring, n', which will be placed on the front of the machine, and connect with the arm. The rocking shaft passes through the arm d and bracket r, by which it is supported, the bracket being bolted to the under side of the machine. On the lower side of the plate, next to the edge thereof, is a post, having an arm, Z, extending out from its top, and slightly curved and inclined toward the rear of the plate. b is a shifting-bar, having a pivot passing through the post, near the top thereof, and then connecting with a crank on its end, the crank connecting with a lever, y, which connects with a crank on the end of the rocking shaft. Thus, it will be seen, the rocking motion of the shaft will raise the bar even with the extension-piece Z of the post, the position of the bar being an inclined one from the top of the post to the curved bar.

The operation of the machine is as follows: When motion is imparted to the inclined shaft, the rakes will be carried around by the gears, the large tooth of the gear causing the teeth thereof to engage or mesh properly with those of the segment, and at the same time the friction-roller of the forked head of the arm of the rake, passing over the curved bar, will be elevated by it, so that it will sweep or rake the platform in a parallel line with it, and upon the release of the gear from the teeth of the segment the pin of the opposite gear will pass between the plate and the guide, and thus prevent the gear from oscillating, so that when it reaches the teeth of the segment its large tooth will be in the proper position to cause the teeth of the gear to engage or mesh properly with those of the segment.

When the driver desires both rakes to operate, by placing the pin of the lever in the fourth hole of the arm P from him the collar will be moved down on the shaft, so that its flange will press the arm R of the rocking shaft outwardly, and retain it in that position, which will necessarily elevate and hold the shifting-bar up. Thus the heads of both rakes will pass under the bar without being shifted. By placing the pin of the lever in the second hole, the collar will be moved on the shaft, so that one of the studs thereof will be caused to impinge against the arm of the rocking shaft, and press it outwardly upon every stroke of the stud thereon. Thus only one of the rakes will be shifted by the head of the rake passing up the incline formed by the shifting-bar, and thence over the extension-piece of the post. By placing the pin of the lever in the first hole, the collar will be moved on the shaft, so that the arm will not be acted upon at all by the studs, and hence both rakes will be shifted.

Having thus fully described my invention, what I claim therein as new, and desire to secure by Letters Patent, is—

1. The inclined plate J, provided with the flange e and curved bar f, in combination with the movable gears A A and fixed segment C, when constructed and operating substantially in the manner and for the purpose as herein described.

2. The movable gears provided with the pins k k, in combination with the guide L, substantially as and for the purpose set forth.

3. The rake-arms provided with forked heads g, when pivoted or hinged to the backs of the gears, in combination with the flange and curved bar, substantially as set forth.

JNO. O. DURBOROW.

Witnesses:
 PETER PONHER,
 N. C. BROOKS.